(12) United States Patent
Riewerts et al.

(10) Patent No.: US 7,694,638 B1
(45) Date of Patent: Apr. 13, 2010

(54) MODULAR LIQUID METERING SYSTEM FOR AN AGRICULTURAL IMPLEMENT

(75) Inventors: Paul R. Riewerts, Port Byron, IL (US); Sylvia Ann Wilson, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/260,747

(22) Filed: Oct. 29, 2008

(51) Int. Cl.
| | |
|---|---|
| A01C 15/00 | (2006.01) |
| A01C 23/00 | (2006.01) |
| A01G 25/09 | (2006.01) |
| B05B 1/00 | (2006.01) |
| B05B 9/03 | (2006.01) |

(52) U.S. Cl. .................... 111/118; 111/121; 111/200; 111/903; 111/904; 111/922; 239/146; 239/602

(58) Field of Classification Search ............. 111/118, 111/120, 121, 200, 903, 904, 921, 922; 239/156, 239/146, 602
See application file for complete search history.

(56) References Cited

U.S. PATENT DOCUMENTS

| 5,407,134 | A  | * | 4/1995 | Thompson et al. .......... 239/156 |
| 7,273,016 | B2 |   | 9/2007 | Landphair et al. |
| 7,395,769 | B2 |   | 7/2008 | Jensen |
| 2006/0086295 | A1 | * | 4/2006 | Jensen ....................... 111/118 |

* cited by examiner

*Primary Examiner*—Christopher J. Novosad

(57) ABSTRACT

A liquid metering system for an agricultural implement is modular, having individual metering pumps for each crop row. The pumps are individually controlled for precise application of the liquid input and are preferable electrically driven. A common pump is used, making the system modular in that varying sizes of implements can be produced by varying the number of pumps. A common supply line is used to supply a liquid input from a reservoir to the pumps. Each pump is connected to the common supply line. By connecting each pump to the common supply line, the difficulty of routing individual hoses from a central pump to each row unit are overcome.

11 Claims, 4 Drawing Sheets

MODULAR LIQUID METERING SYSTEM FOR AN AGRICULTURAL IMPLEMENT

FIELD OF THE INVENTION

The present invention relates to a liquid metering system for a machine such as an agricultural implement and in particular to a metering system that is modular and adapted to vary the quantity of common components depending on the width of the implement to which the system is installed.

BACKGROUND OF THE INVENTION

Liquid fertilizer is commonly applied to an agricultural field before, during or after planting of a crop. A typical liquid fertilizer application system includes a tank for holding the liquid fertilizer, a pump for pumping the fertilizer from the tank, a plurality of distribution lines that eventually deliver the liquid to a delivery tube or spray nozzle, for placing the liquid on or in the soil near the plants. Down stream from the pump, various orifices, valves, etc are used to meter the volume of liquid directed to each crop row or outlet to deliver the desired application rate. The size of the pump is dependent on the width of the machine, i.e. the number of crop rows to be treated. Furthermore, the flow control orifices, and or valves must be customized for each row, taking into consideration the length of the line from the pump to the row. This adds considerable complexity to the manufacture of multiple machine models, types and widths.

As the cost of fertilizers and other inputs to an agricultural fields increase, it becomes more important to precisely control the application of inputs to the field to avoid excess application rates, overlaps in application, application to non-crop areas, etc. One such system for doing so is described in U.S. Pat. No. 7,395,769. This patent describes a liquid application system with a single pump supplying liquid to a number of bypass valves, one for each row. The bypass valves are controlled to vary the rate of liquid application at each row. This system requires a liquid return line for the bypassed liquid. Furthermore, the size of the pump must vary over a full line of implements widths, or a single maximum sized pump is used on all implements, adding unnecessary cost to those implements not needing the full capacity of the pump.

SUMMARY OF THE INVENTION

The liquid metering system of the present invention is modular, having individual metering pumps for each crop row. The pumps are individually controlled for precise application of the liquid input. A common pump is used, making the system modular. Implements of different widths can be produced by varying the number of pumps in the system. A common supply line is used to supply a liquid input from a reservoir to several or all of the pumps. Each pump is connected to the common supply line by a feeder line or could be directly coupled to the common supply line. The feeder lines are all identical. By connecting each pump to the common supply line, the difficulty of routing individual hoses from a central pump to each row unit are overcome. The only component that varies for different implement widths is the common supply line, which varies in length as it extends widthwise of the implement. The common supply line can be made modular as well with a section added for each row unit of additional implement width.

DESCRIPTION OF THE PREFERRED EMBODIMENT

Figure 1:
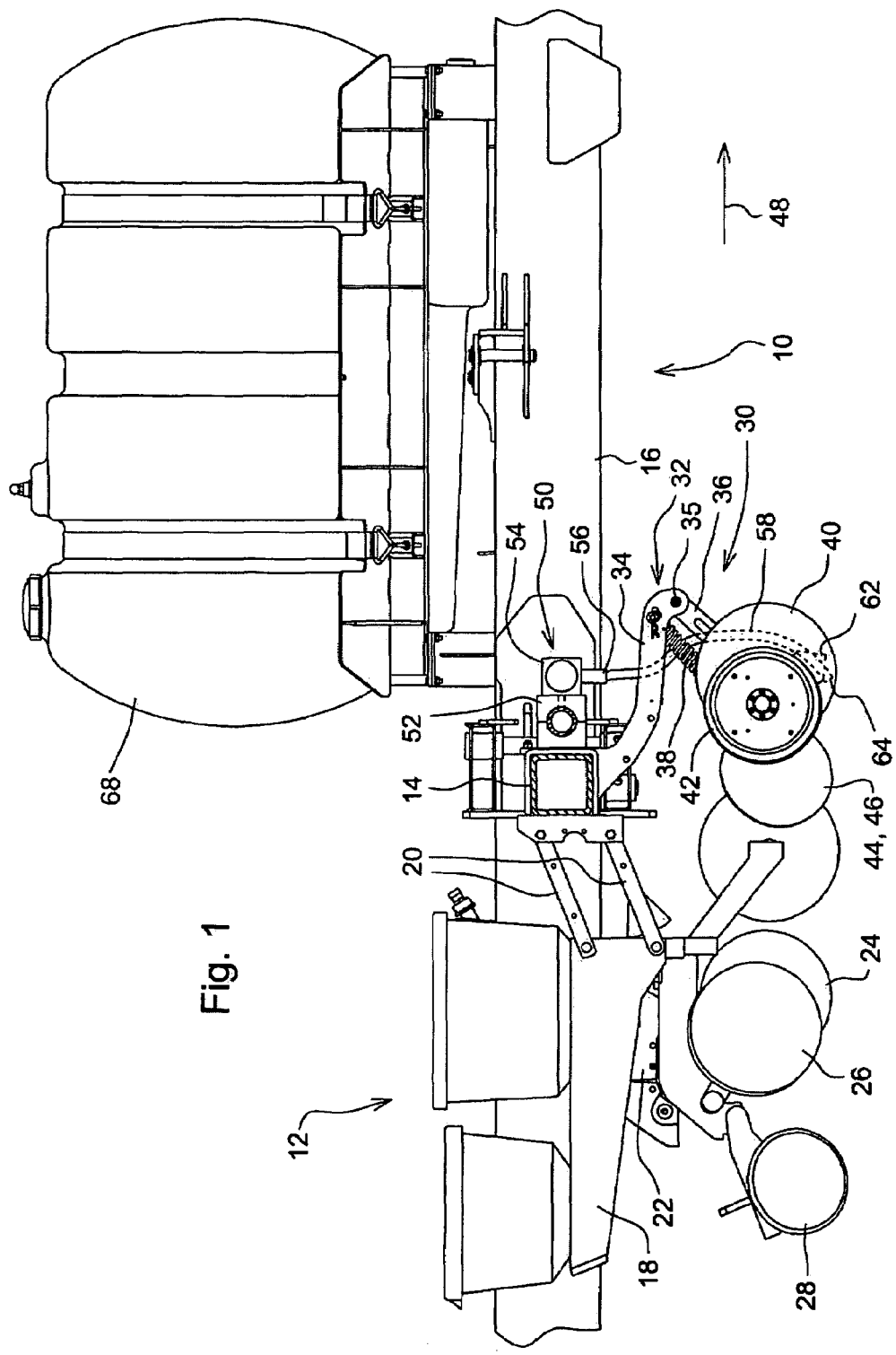
FIG. 1 is side view of planter having the liquid metering system of the present invention.

The liquid metering system of the present invention is shown installed on the implement 10 in FIG. 1. Implement 10 is a planter but could be a grain drill, air seeder, seedling planter, bulb planter, etc where it is desired to apply a liquid, such as fertilizer. The metering system will be described in the context of a planter but is not limited to use on a planter, but could be used on an implement dedicated solely to a liquid application.

Figure 2:
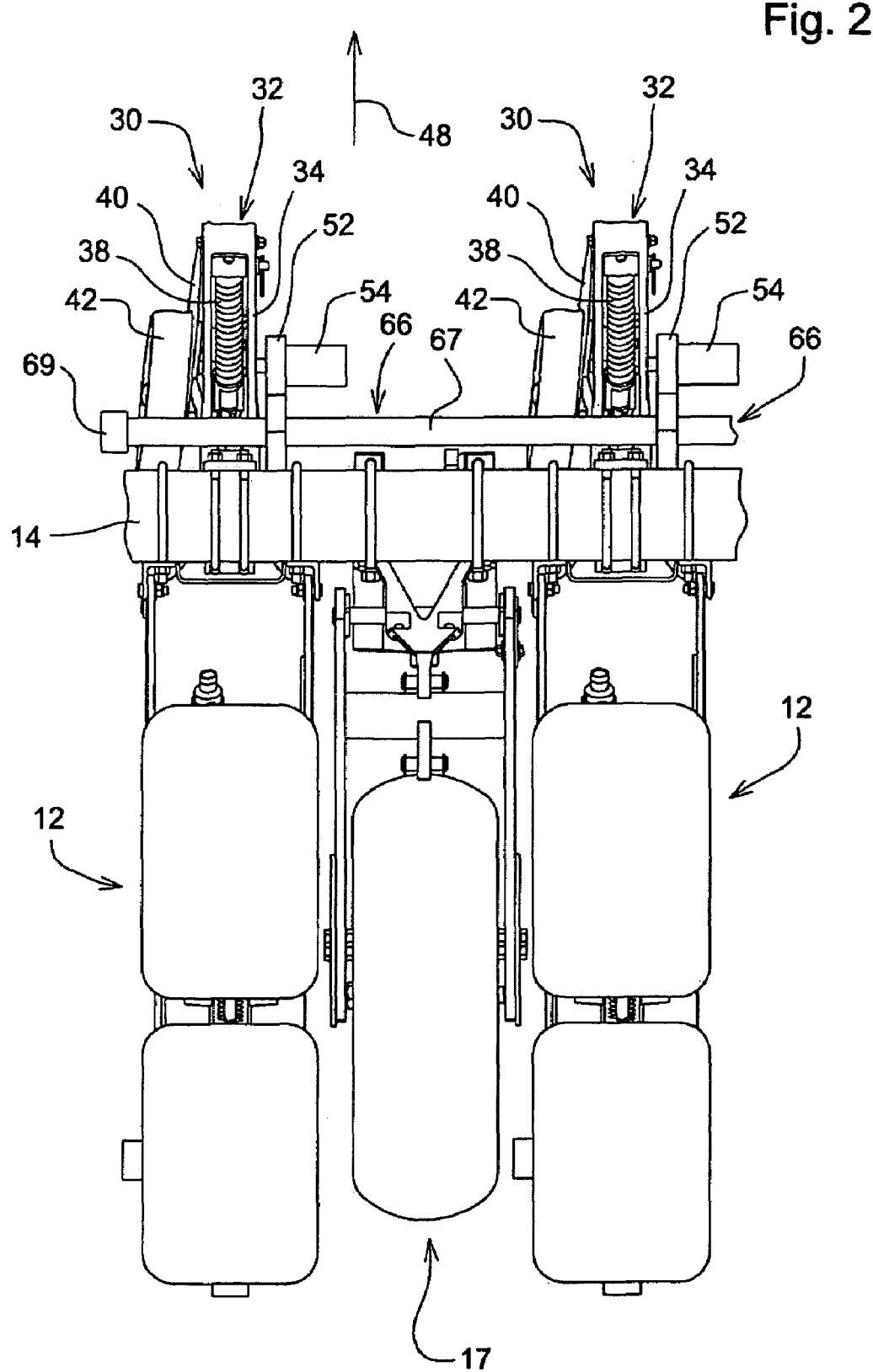
FIG. 2 is a top view of a section of the implement of FIG. 1.

Implement 10 generally includes a plurality of row units 12 with each row unit 12 being substantially identical (although left hand and right hand units 12 may be provided, as required for the specific application). Only one row unit 12 is shown in FIG. 1 for simplicity sake. Each row unit 12 is connected to a tool bar 14 that is part of a frame 16 of the planter/implement. The frame 16 may be provided with multiple support wheel assemblies 17 shown in FIGS. 2 and 4, which may be of conventional design. Furthermore the frame 16 is coupled to a traction unit, such as an agricultural tractor 72 shown in FIG. 4. The row unit 12 includes a frame 18 mounted to the tool bar 14 through a linkage 20 that allows up and down relative movement between the row unit and tool bar. The row unit frame carries a seed meter 22, furrow opener 24, seed tube (not shown), gauge wheel(s) 26 and a furrow closer 28 for the purpose of planting seed.

As shown, a fertilizer applicator assembly 30 is shown with one assembly 30 provided for each planter row unit 12. The fertilizer applicator assembly includes a frame assembly 32 having a first member 34 coupled to the to the tool bar 14 forward of the row unit 12. A second frame member 36 is rotational mounted to the first frame member 34 at a pivot 35 and is biased downward by a spring 38. A fertilizer opener 40 is carried by a frame member 36. The depth of penetration of the fertilizer opener 40 is controlled by gauge wheel 42 also carried by the frame member 36. Alternatively, the fertilizer opener could be mounted to the row unit frame 12. Other variations in the fertilizer applicator assembly and its mounting to the planter will be readily apparent to those skilled in the art.

The fertilizer applicator assembly 30 opens a trench in the soil into which fertilizer is deposited. In this case a liquid fertilizer is applied. However the assembly 30 can be adapted to apply dry or gaseous fertilizers in well known manners. First and closing discs 44, 46 follow closely behind the gauge wheel 42 to close the furrow after the liquid, such as fertilizer, is applied. The fertilizer applicator assembly 30 is only shown as an example implement to which the liquid metering system of the present invention is installed. It will be apparent to one of ordinary skill that the metering system of the invention, described below, may be used with any of a variety of fertilizer opener/closer mechanisms.

The modular liquid metering system 50 includes, for each fertilizer applicator assembly 30, a metering pump 52 mounted to the tool bar 14. Metering pump 52 can be of a variety of positive displacement pumps. Metering pump 52 is driven by an electric motor 54, which is controlled as described below, to start, stop and vary the rate of liquid delivered by the pump 52. In a preferred embodiment, the pump and motor are integral as a single unit. The pump outlet 56 is connected to a delivery tube 58. A lower end of the tube 58 is attached to a boot/scraper 62, partially shown so as to position the discharge end 64 of the delivery tube 58 within the furrow formed by the fertilizer opener 30 to deliver liquid fertilizer thereto. A nozzle and/or check valve may be provided at the discharge end 64.

The metering system 50 further includes a common supply line 66 attached to the tool bar 14 and extending transversely to the implement working direction shown by arrow 48. Preferably the metering pumps are flow through pump such that they are arranged in-line with the common supply line and form a part thereof. The liquid flows through the pump to those pumps down stream there from. An internal pump inlet receives liquid flowing through the pump body. The common supply line 66 is formed by multiple pumps and extension tubes 67 between each pump. More pumps 52 and extension tubes 67 are added as the machine width increases with more row units. The pump at the downstream end is closed by a cap 69. Alternatively, the common supply line 66 can be equipped with multiple T-fittings coupled to metering pumps that are not part of the common supply line.

The common supply line 66 is coupled to a tank or liquid reservoir 68 in a conventional manner. Liquid from the reservoir 68 is gravity fed to the common supply line 66 and to the individual metering pumps 52, thus eliminating the need for a central pump near the reservoir 68 to deliver metered liquid to each individual row unit. However, for very wide implements, a pump at the reservoir or line 68 may be beneficial to ensure adequate supply of liquid to the individual metering pumps 52. Various shut off valves (not shown) can be placed between the reservoir 66 and the pumps 52 as needed to facilitate servicing of the system if desired.

The common supply line 66 may be a single line extending the width of the implement. If the frame 16 is a folding frame, the supply line 62 may included flexible portions to accommodate the frame folding. Alternatively, each section of the frame may have its own common supply line, each common supply line being connected to the reservoir 68 and adapted to accommodate the frame folding. In such an application, the common supply line on a given section of the frame supplies liquid to all of the metering pumps 52 on that section of the frame.

The metering system 50 is modular in that as the width of the implement increases, the manufacturer adds to the length of the common supply line 66 and adds additional common pumps 52, electric motors 54 and application tubes 58. Each of these are identical for each row, thus the number of different parts and part numbers that a manufacturer or service provider must stock and manage is minimized. This is in contrast to liquid delivery systems that employ a single pump at the reservoir. In such an instance, unique pumps are required for different width implements to meter liquid to differing number of liquid applicator assemblies 30. Various valves, flow dividers, etc must be employed to meter the desired rate of liquid to each of the rows, making it more difficult to control the application rate at the individual row.

Figure 3:
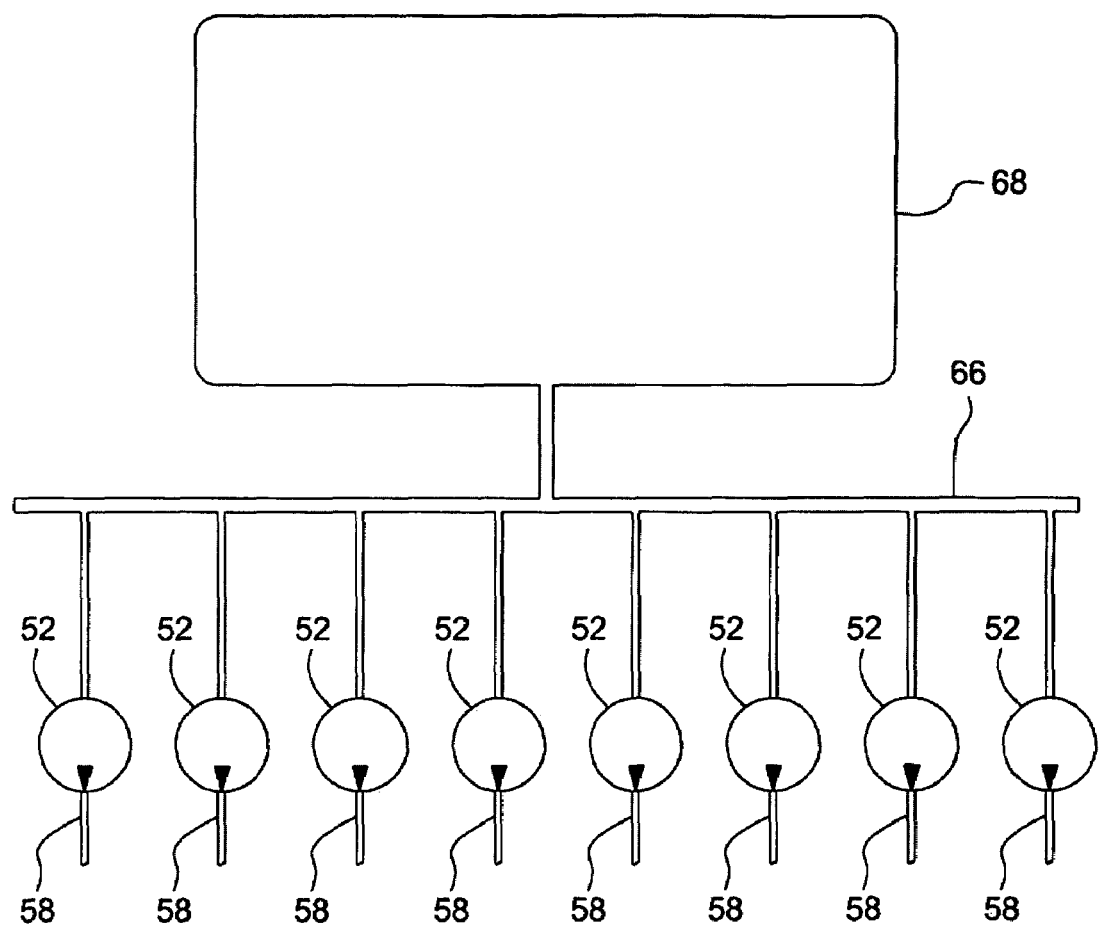
FIG. 3 is a schematic view of the liquid metering system of the present invention.
Figure 4:
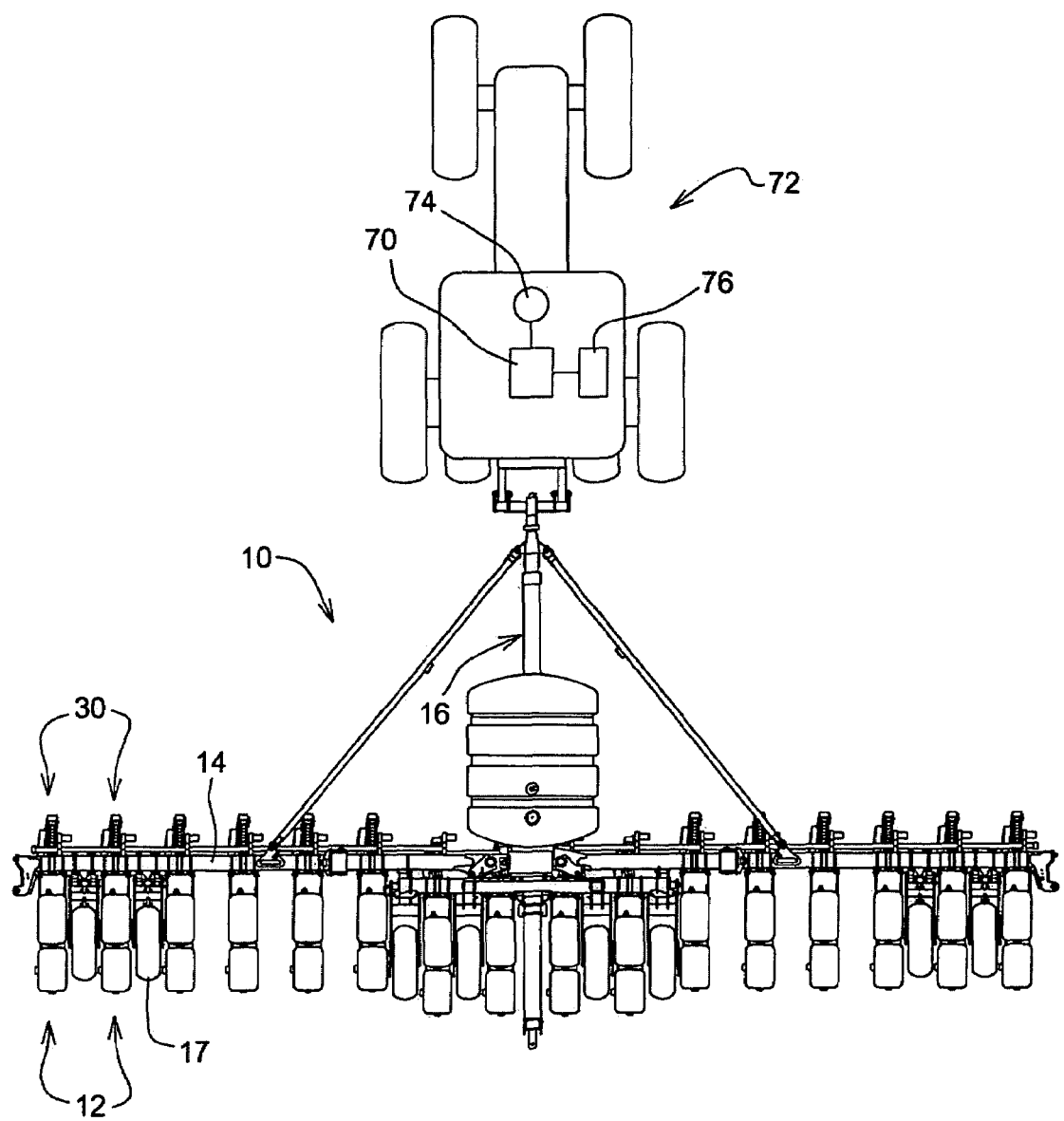
FIG. 4 plan view of the planter shown in FIG. 1 coupled to a tractor.

A schematic drawing of the modular liquid metering system 50 is shown in FIG. 3. The simplicity of the system, with individual metering pumps for each row is shown. With reference to FIG. 4, the implement 10 is shown coupled to the tractor 72.

Each motor 54 of the metering system 50 is electrically connected to a controller 70, typically mounted to the tractor 72. Also carried by the tractor and coupled to the controller is a GPS receiver 74. The controller has a memory that stores field information including the size and shape of the field in which the implement is operating as well as green areas in the field that do not need liquid application. The field information may also include agronomic information about the field, such as soil type, etc. Application rates for some liquid inputs, such as fertilizer, may vary depending on soil type, etc. The GPS receiver supplies signals to the controller in real time regarding the geospatial location of the implement. The controller uses the signals to determine the location of the implement in the field, the direction of travel and the speed of travel. The controller uses both the GPS and the field information to control the application rate of each pump according to a prescription as the implement is moved through the field. The controller and varies the speed of the motors 54 accordingly, to vary the speed of, or turn on and off, the pumps 52. In addition, the controller 70 uses the field information and the path of the implement to avoid applying liquid on overlaps, headlands, waterways, point rows, etc. where it is not desired to apply the liquid. This reduces input costs and reduces the environmental impact of the use of the liquids.

By locating the pumps at the row unit, a change in the liquid application rate at the pump 52 is almost immediately experienced at the tube discharge end. In addition, long hoses extending form a flow divider to each row unit are avoided and the difficulty in routing such hoses and ensuring all are the same length for metering and avoiding any kinks in the hoses.

Electric power for the motors 54 can be provided by the tractor electrical system or by a separate generator on the tractor or implement. An implement mounted generator could be powered by an engine, PTO, or by ground engaging wheels 17 on the implement, etc. The application rate by location for each pump can be recorded by the controller and the data used for management of the field. In addition, the application rate can be displayed to the operator by a display 76 on the tractor 72.

While the invention is described using electric motors as variable speed drive mechanisms to drive the pumps 52, it is understood that other variable speed drive mechanisms may be used in place of the electric motors such as, but not limited to, hydraulic motors, variable speed mechanical transmissions, etc.

Having described the preferred embodiment, it will become apparent that various modifications can be made without departing from the scope of the invention as defined in the accompanying claims.

The invention claimed is:

1. A liquid metering system for an implement having a width and adapted to travel through a field in a direction parallel to multiple crop rows, the liquid metering system comprising:
   multiple metering pumps with one pump associated with each crop row;
   a liquid reservoir for holding a quantity of liquid to be applied to the field;
   a common supply line receiving liquid from the reservoir and extending widthwise of the implement and in fluid communication with the metering pumps;

multiple application tubes, each one of the application tubes extending from one of the multiple pumps to discharge liquid from the associated pump in the proximity of a crop row; and multiple variable speed drive mechanisms for driving each pump.

2. The liquid metering system for an implement as specified in claim 1 wherein the variable speed drive mechanisms include an electric motor for driving each pump.

3. The liquid metering system for an implement as specified in claim 1 further comprising a controller connected to each variable speed drive mechanisms for controlling the speed of each of the variable speed drive mechanisms.

4. The liquid metering system for an implement as specified in claim 3 further comprising:
   a GPS receiver connected to the controller for providing signals to the controller from which the location, speed and direction of the implement can be determined; and
   wherein the controller has a memory in which field information is stored.

5. A liquid metering system for a planter, the planter having multiple mechanisms for planting seed or seedlings in rows, the liquid metering system comprising:
   a reservoir for containing a liquid;
   a metering pump located at each of the multiple mechanisms for planting seed or seedlings of the planter,
   a variable speed drive mechanism for each metering pump;
   one or more common supply lines each providing fluid communication between the reservoir and multiple metering pumps;
   a liquid delivery line extending from an outlet of each pump to the associated row; and
   a controller for individually controlling the variable speed drive mechanism of each of the metering pumps.

6. A liquid metering system for a planter as specified in claim 5 wherein the variable speed drive mechanism comprises an electric motor for each pump.

7. A liquid metering system for a planter as specified in claim 5 further comprising an GPS receiver providing signals to the controller from which the location, speed and direction of travel of the implement is determined.

8. A planter for planting seed or seedlings in multiple rows, comprising:
   a frame extending transversely to the rows;
   multiple row units mounted to the frame for placing seed or seedlings in the soil;
   multiple metering pumps with one of said multiple pumps for each of said row units;
   individual variable speed drive mechanisms for each of the metering pumps;
   a reservoir for holding a liquid mounted to the frame;
   at least one common supply line receiving liquid from the reservoir and extending transversely to the rows in fluid communication with the pumps; and
   a controller for individually controlling each of the individual variable speed drive mechanisms whereby the rate of liquid application at each row unit can be controlled independently of the other row units.

9. The planter of claim 8 wherein the individual variable speed drive mechanisms are electric motors.

10. The planter of claim 8 wherein each metering pumps is mounted the frame adjacent the associated row unit.

11. The planter of claim 8 wherein the controller has a memory that stores field mapping information and further comprising a GPS receiver providing signals to the controller from which the location of the planter in the field and the planter speed and direction of travel are determined and the rate of liquid application at each of the multiple metering pumps is determined based on the location, direction and speed of travel of the planter in the field.

\* \* \* \* \*